(12) United States Patent
Robb (10) Patent No.: US 6,903,357 B2
(45) Date of Patent: Jun. 7, 2005

(54) SOLID STATE SPARK DETECTION

(75) Inventor: Andrew M. Robb, Kent, WA (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 10/282,488

(22) Filed: Oct. 28, 2002

(65) Prior Publication Data

US 2004/0079905 A1 Apr. 29, 2004

(51) Int. Cl.$^7$ .................................................. G01J 1/22
(52) U.S. Cl. ...................................... 250/554; 340/577
(58) Field of Search ................. 250/554; 340/557–578, 340/540, 601; 361/111

(56) References Cited

U.S. PATENT DOCUMENTS

| | | |
|---|---|---|
| 3,787,707 A | 1/1974 | Gregg |
| 6,078,050 A * | 6/2000 | Castleman ............. 250/339.15 |
| 6,208,252 B1 * | 3/2001 | Danilychev ................. 340/577 |

* cited by examiner

Primary Examiner—Stephone B. Allen
Assistant Examiner—Patrick J. Lee
(74) Attorney, Agent, or Firm—Black Lowe & Graham, PLLC (57) ABSTRACT

An apparatus, system, and method for solid state spark detection are disclosed. A semiconducting photodetector has a pair of electrical conductors for carrying an electrical current generated when the semiconducting photodetector receives light energy generated by sparks. An electrical current detector is operably coupled with the electrical conductors for sensing the electrical current generated to signal receipt of the light energy generated by sparks. The present invention can be coupled to a monitoring device, such as an oscilloscope, for monitoring intensity and/or timing of spark phenomena. A plurality of semiconducting photodetectors and associated electrical current detectors may be used in concert if desired. The semiconducting photodetectors are suitably adapted to respond to light energy of different magnitudes or wavelengths to more particularly study sparks of different natures.

58 Claims, 4 Drawing Sheets

SOLID STATE SPARK DETECTION

FIELD OF THE INVENTION

This invention relates generally to detection of light energy and, more specifically, to detecting light energy caused by the generation of sparks.

BACKGROUND OF THE INVENTION

Unwanted sparks or arcs of electrical energy can present a problem. At a minimum, generation of sparks can interfere with light sensitive applications or ruin photosensitive emulsions. On another hand, of perhaps greatest concern is the generation of sparks in the presence of flammable or combustible materials, which can result in a fire or an explosion. It is for this latter reason that chemical producers, petroleum companies, and aerospace companies, just to name a few, study spark generation phenomena to prevent harms that might result from sparks or arcs caused by lightning, discharge of static electricity, or other sources.

To name one example, in the aerospace industry, it is a concern that lightning striking an aircraft could result in the generation of sparks where fuel-vapor mixtures might exist. The Federal Aviation Authority (FAA) recognizes that, at a minimum, spark energy of 200 uJ is capable of igniting a fuel-vapor mixture. As is understood in the art, although lightning strikes pass right through aluminum aircraft en route to a ground source and harm virtually never results, manufacturers remain vigilant in evaluating new materials and components to ensure unacceptable sparks are not produced. To that end, manufacturers test aircraft materials and components by simulating lightning strikes and monitoring to determine if sparks are produced.

Spark detection tests are conducted in light-sealed chambers. Simulated lightning is generated by discharging a bank of high voltage capacitors. The simulated lightning is applied to an object of study, such as a "coupon" of aircraft fuselage material, or joined sections of aircraft hull material, which is coupled to ground. Whether the electrical charge carried by the simulated lightning strike passes through to ground or results in generation of spurious sparks is conventionally monitored photographically. Photographs of the object of study are taken by 35 millimeter or Polaroid® cameras. The shutter of the camera is opened before the simulated lightning strike is applied and closed before the light-sealed chamber is opened to study the object under test. As is known, ASA 1000 35 millimeter film or ASA 3000 Polaroid® film will reveal the emission of a 200 uJ or greater spark. Studying the resulting photographs, therefore, allows researchers to determine if sparks resulted from simulated lightning strikes and, specifically, where on the object of study sparks originated.

Unfortunately, photographic methods do not provide information as detailed or refined as researchers would like. Because the response of photographic film to light is highly nonlinear, the intensity of sparks generated must be estimated from the brightness of the image of the spark or the cross-sectional area on the film spanned by the spark's image. Film also may not be able to perceive light in the infrared spectrum or even the deep red of the visual spectrum. Thus, events of possible concern could be missed. Also, film cannot indicate exactly when the spark actually was generated during the interval the shutter was open. Further, film cannot indicated how long the event lasted or whether multiple sparks that might appear on a photograph occurred simultaneously or at different times. Finally, particularly with 35 millimeter film, researchers also must wait while the film is developed to begin their studies.

In an attempt to improve on photographic techniques, photomultiplier tubes (PMTs) also have been used to monitor sparks. For example, PMTs allow for determining precisely when sparks are generated. Also, the output of a PMT can be used to measure intensity of sparks detected. However, although PMTs are very sensitive and can detect even single-photon events, they also have disadvantages. For example, because of the unpredictability of the output of the photomultiplying process, the output may not accurately represent intensity of sparks recorded. Also, PMTs are expensive to manufacture and are extremely fragile. In addition, PMTs are very sensitive to noise common in high energy environments such as lightning testing chambers. PMTs also must be kept away from light sources, receiving light signals through expensive fiber-optic lines.

Therefore, there is an unmet need in the art for a better way to measure emission of potential sparks and to more precisely determine the timing and intensity of sparks emitted. At the same time, it is desired to have a spark detector that is inexpensive, durable, and that yields quick results.

SUMMARY OF THE INVENTION

The present invention provides a system for detecting sparks by using a solid state device for detecting the light energy generated by the sparks. Using a solid state device, such as a semiconducting photodetector, offers advantages over highly nonlinear photographic techniques in being able to measure spark intensity and to report the exact time at which sparks were emitted. The present invention also provides advantages over PMT detection of sparks because semiconducting photodetectors are less expensive, more durable, and more easily protected from expected noise phenomena than are PMT detectors.

An exemplary embodiment of the present invention employs a semiconducting photodetector having a pair of electrical conductors for carrying an electrical current generated when the semiconducting photodetector receives light energy generated by sparks. An electrical current detector is operably coupled with the electrical conductors for sensing the electrical current generated to signal receipt of the light energy generated by sparks.

The present invention can be coupled to a monitoring device, such as an oscilloscope, for monitoring intensity and/or timing of spark phenomena. Further, a plurality of semiconducting photodetectors and associated electrical current detectors may be used in concert if desired. The individual semiconducting photodetectors can be suitably adapted to respond to light energy of different magnitudes or wavelengths to more particularly study sparks of different natures.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
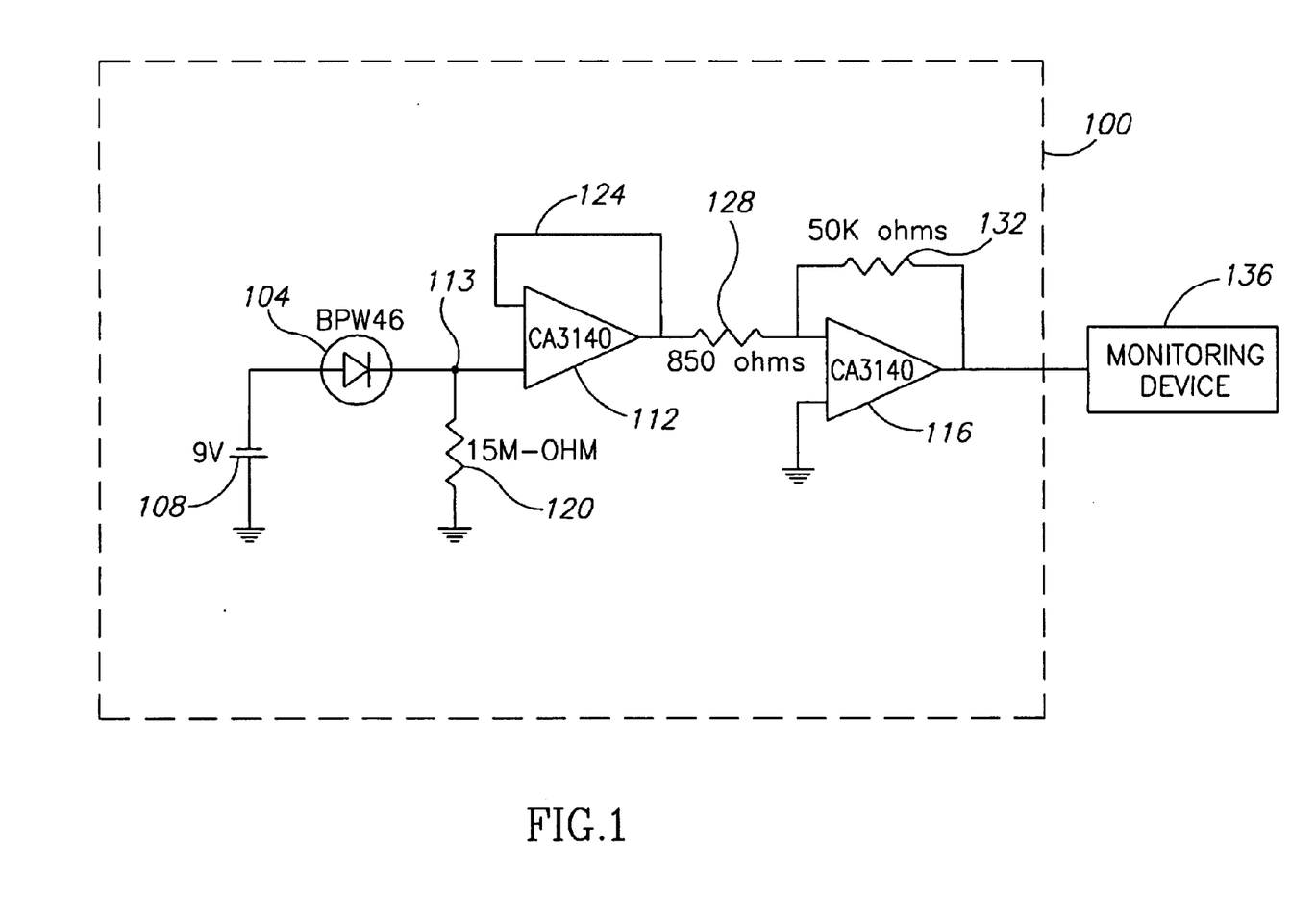
FIG. 1 is a schematic view of a semiconducting photodetector circuit employed in an embodiment of the present invention.

FIG. 1 is a schematic diagram of an exemplary solid state spark detecting circuit 100 used in an embodiment of the present invention. In general, the circuit 100 employs a solid state, semiconducting photodetector 104 to detect sparks by generating an electric current in response to receiving light energy from the sparks. The electric current generated by the semiconducting photodetector 104 is amplified by a first operational amplifier (op amp) 112 and a second op amp 116. The amplified electrical current is monitored and studied with a monitoring device 136 to determine the presence and intensity of generated sparks as detected by the solid state spark detecting circuit 100.

More specifically, the semiconducting photodetector 104 shown in FIG. 1 is suitably a P-N junction photodiode, such as a Vishay-Telefunken BPW46. The BPW46 is a high speed, high sensitivity photodetector with a photon-receiving area of 7.5 square millimeters, a 5 nanoampere dark current, a response time of 100 nanoseconds, and a spectral bandwidth of 600 to 1150 nanometers. The BPW46 is capable of detecting sparks at and below the 200 uJ energy limit acknowledged by the FAA as the minimum energy spark capable of igniting a fuel-vapor mixture.

In addition to P-N junction photodiodes like the BPW46, other semi-conducting photodiodes can be used. For example, P-i-N photodiodes can be used as the semiconducting photodetector 104 in the spark detecting circuit 100. Advantageously, P-i-N photodiodes feature an intrinsic layer of pure silicon between the acceptor P layer and the donor N layer to extend the width and thus the sensitivity of the photosensitive junction, also. Also, a highly biased avalanche P-N junction photodiode can be used. Avalanche P-N junction photodiodes are highly sensitive to light energy and are able to react to even single photons received.

The semiconducting photodetector 104 is reverse biased with a direct current power supply 108. A 9-volt battery is suitably used as the power supply 108, with its negative terminal connected to the anode of the semiconducting photodetector and its positive terminal coupled to ground. Alternatively, if an avalanche P-N junction photodiode is selected as the photoconducting semiconductor, a larger power supply 108 having an output of larger than 9 volts could be employed to suitably bias the semiconducting photodetector.

An output of the semiconducting photodetector 104 is coupled with a first input of the first op amp 112 used in a voltage-follower configuration. A node 113 between the semiconducting photodetector 104 and the first input of the first op amp 112 is coupled to ground with a high-resistance pull-down resistor 120. In the embodiment shown in FIG. 1, a 15 mega ohm resistor is used. A second input of the first op amp 112 receives a feedback branch 124 from an output of the first op amp 112, thereby completing the voltage follower configuration.

The first op amp 112 shown in FIG. 1 is suitably a CA3140 BiMOS op amp. The CA3140 is a low noise op amp, which is well suited to responding to and amplifying small electrical currents that might be generated by the semiconducting photodetector 104. The CA3140 has a high input resistance of 1.5 terraohms, a slew rate of 9 volts/microsecond, and drains only 3 milliamps of current, thus allowing for long battery life. Other op amps known in the art with suitable low noise characteristics can also be used in embodiments of the present invention.

The output of the first op amp 112 is applied to a second input of a second op amp 116, which is configured as an inverting amplifier. More specifically, the output of the first op amp 112 is coupled to the second input of the second op amp 116 through a resistor 128, such as without limitation an 850 ohm resistor. The second input of the second op amp 116 also receives a feedback loop 132 from an output of the second op amp 116. A first input of the second op amp 116 is tied to ground, thereby completing the inverting amplifier configuration.

The output of the second op amp 116, which is the output of the solid state spark detecting circuit 100, is coupled to the monitoring device 136, such as an oscilloscope. As is well known in the art, an oscilloscope can be variably configured to read voltage and current signals. An appropriately equipped oscilloscope can be used to read both an applied voltage signal, such as might be used to simulate a lightning strike of the object under study, and the output of the solid state spark detecting circuit 100 to study a relationship between the applied electrical current and the resulting sparks detected.

Figure 2:
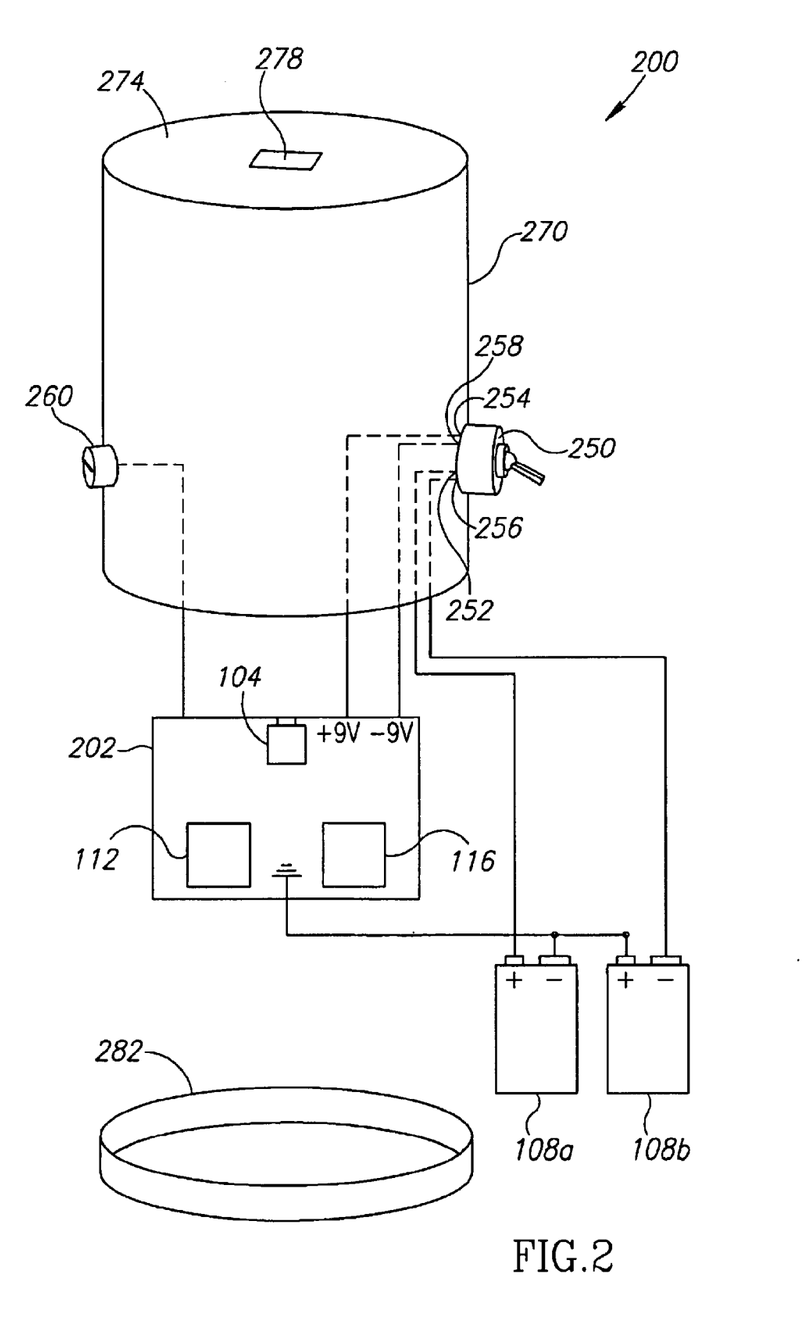
FIG. 2 is a disassembled, perspective view of a semiconducting photodetector device used in an embodiment of the present invention.

FIG. 2 shows an exemplary spark detecting device 200 that includes the solid state spark detecting circuit 100 (FIG. 1). The solid state spark detecting circuit 100 (FIG. 1) suitably is implemented on a circuit board 202 on which are mounted the semiconducting photodetector 104, the first op amp 112, and the second op amp 116, all previously described. The semiconducting photodetector 104, the first op amp 112, and the second op amp 116 are electrically connected as described above in connection with FIG. 1.

In addition, two nine-volt batteries 108a and 108b are used as a power supply for the solid state spark detecting circuit. Twin nine-volt batteries 108a and 108b are chosen, as will be appreciated by one ordinarily skilled in the art, to supply not only ground but also to supply positive and negative nine-volt voltage sources required to power the op amps. The terminals of the batteries 108a and 108b are connected as shown to a dual-throw switch 250. As shown, a first input 252 of the switch 250 is connected to a first output 254 of the switch 250 when the switch 250 is closed. Similarly, a second input 256 of the switch 250 is connected to a second output 258 of the switch 250 when the switch 250 is closed. Coupling a positive terminal of the first battery 108a to the first input 252 of the switch 250 and a negative terminal of the second battery 108b to the second input of the switch 250 couples those respective terminals to the circuit board 202 as shown when the switch 250 is closed. At the same time, commonly coupling a negative terminal of the first battery 108a and a positive terminal of the second battery 108b to the circuit board 202 at a ground terminal creates the positive and negative nine-volt power sources used.

An output of the circuit board 202, which constitutes the output of the second op amp 116 (FIG. 1) is coupled to a connector 260. The connector 260 in an embodiment of the present invention is suitably a BNC connector matching an input of a conventional oscilloscope for monitoring the output of the solid state spark detecting circuit 100 (FIG. 1).

The electronic components previously described are contained, as shown in FIG. 2, in a shielding housing 270. The shielding housing 270, in one embodiment, has layers of steel or another suitably magnetically shielding material to block magnetic effects in a high voltage environment, such as a lightning simulator, from interfering with the operation of the spark detecting device 200. The shielding housing 270 also may have layers of copper, aluminum, or any other suitably electrically shielding material to shield the electronics from electrical interference which also attends such an environment. As shown in FIG. 2, the shielding housing 270 can be cylindrical, with the switch 250 and the connector 260 mounted on sides of the shielding housing 270. In one embodiment of the present invention, a front face 274 of the shielding housing 270 is positioned to face an expected source of potential sparks. In the front face 274 an observing opening 278 is made in which the semiconducting photodetector 104 is positioned to be able to receive light energy generated by potential sparks. The device 200 can be enclosed by adding a back cover 282 to the shielding housing 270. The back cover 282 also should be constructed of shielding materials as previously described.

More specifically, in one embodiment the shielding housing 270 is suitably constructed using a section of copper pipe for electrical shielding, the section of copper pipe having an internal diameter and a length large enough to accommodate the electronics previously described. Copper end caps are suitably used to form both the front face 274 of the shielding housing 270 and the back cover 282. An observing opening 278 is sized to accommodate the semiconducting photodetector 104 drilled or cut into the end cap serving as the front face 274. A section of steel pipe with an inner diameter larger than the outer diameter of the end caps and as long as the section of copper pipe is suitably installed around the copper pipe to provide magnetic shielding. Holes can be drilled in the sections of copper and steel pipe for mounting the switch 250 and the connector 260 and through which wires connecting the switch 250 and the connector 260 to the circuit board 202 can pass.

Using embodiments of the present invention, multiple solid state, photodetecting semiconductor devices could be used in a single region of interest. Multiple circuits, like the solid state spark detecting circuit 100 (FIG. 1) could be housed in a single shielding housing 270 or in separate shielding housings, with each semiconducting photodetector 104 being adapted to receive different types of light. For example, the semiconducting photodetectors 104 could be filtered to each respond to different magnitudes of light energy or different wavelengths of light energy. Using multiple circuits allows more particularized study of different types of sparks to better understand the spark-generating phenomena in bodies under test.

Figure 3:
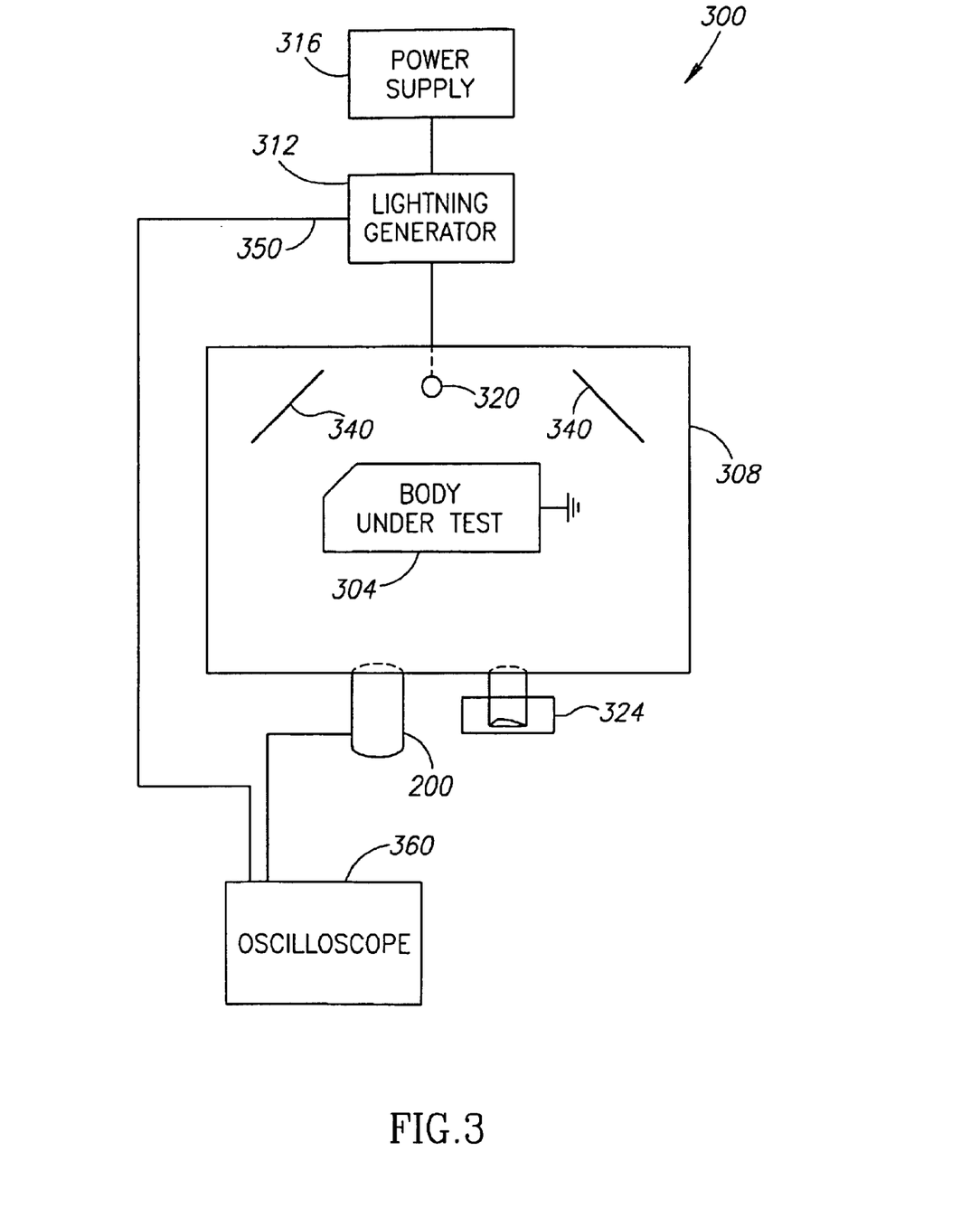
FIG. 3 is a block diagram of a spark testing apparatus employing an embodiment of a solid state photodetector of the present invention.

The spark detecting device shown in FIG. 2 can be deployed in a number of environments where sparks are to be detected. FIG. 3 shows one exemplary environment, such as a lightning simulator 300 in which a body under test 304 is contained in a light-tight chamber 308 and subjected to simulated lightning strikes. The body under test 304 may be a coupon of a aircraft material of a single type, a joined section of different materials, a fuel or petroleum fitting, or another body. The body under test 304 is connected to ground and will receive simulated lightning strikes. The simulated lightning strikes are generated by a lightning generator 312 that is powered by an appropriate power supply 316. The lightning generator delivers the simulated lightning strike via a probe 320 disposed in or adjacent to the light-tight chamber 308. The light-tight chamber 308 shields the body under test 304 from ambient light so that light energy which is detected is light energy generated by sparks caused by the simulated lightning strikes.

The light-tight chamber may be equipped with a conventional camera 324, such as a 35 millimeter or Polaroid® camera, along with the solid state spark detecting device 200 of the present invention. The camera 324 and the solid state spark detecting device 200 are mounted to observe the body under test. The camera 324 and the solid state spark detecting device 200 both can be mounted to observe the body under test through light-tight openings in the light-tight chamber 308, or can be positioned within the light-tight chamber, provided there is a mechanism by which a shutter of the camera 324 can be controlled from outside the light-tight chamber 308. To enable the camera 324 and the solid state spark detecting device 200 to be able to better observe and detect sparks which might be emitted on a far side of the body under test, mirrors 340 can be positioned inside the light-tight chamber 308 to reflect light energy from the opposite side of the body under test 304 toward the camera 324 and the solid state spark detecting device 200. The output of the solid state spark detecting device 200, optionally along with a monitoring output 350 of the lightning generator 312, can be connected to an oscilloscope 360 for studying the output of the solid state spark detecting device 200.

In addition to the lightning simulator 300 environment shown in FIG. 3, it will be appreciated that the solid state spark detecting device 200 can be used in any number of contexts. The solid state spark detecting device 200 could be deployed, for example, in working devices and equipment to detect the generation of sparks. Although the context would require a light-controlled or otherwise darkened environment, the solid state spark detecting device 200 could be deployed in fuel flow testing devices. The flow of fuels can statically charge vessels through which they flow, thereby resulting in the risk of sparks arcing through surrounding air. Testing may be performed to ensure that sparks are not being generated which could ignite a fuel-air vapor. Similarly, in a petroleum refinery or other body through which fuels flow, a solid state spark detecting device could be deployed to monitor for emission of sparks which may indicate failed grounding circuitry or other potential problems.

Figure 4:
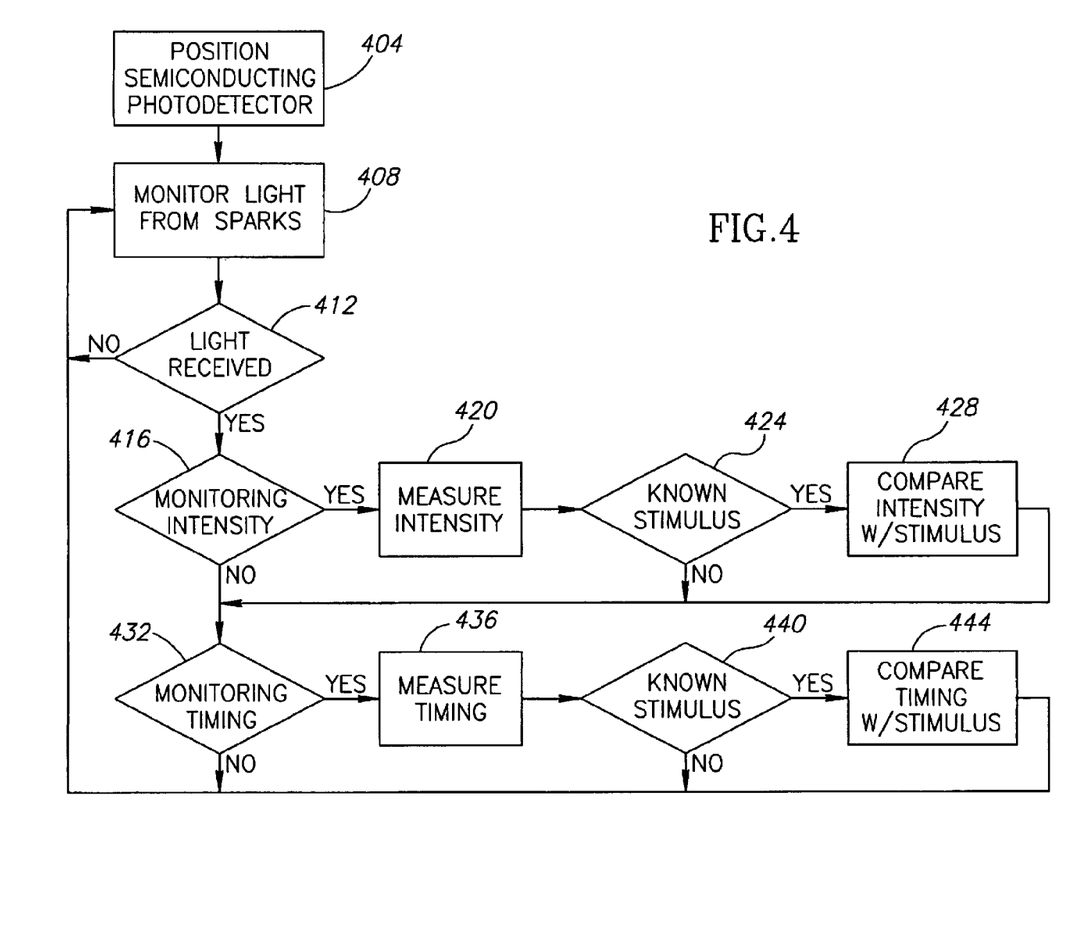
FIG. 4 is a flowchart of a method for detecting sparks of an embodiment of the present invention.

FIG. 4 is a flow-chart describing a method of detecting sparks with a solid state spark detecting device such as that previously described. At a block 404, the semiconducting photodetector device is positioned where it can receive light energy generated by potential sparks of interest. At a block 408, the semiconducting photodetector is energized and enabled to monitor light energy generated by sparks. At a decision block 412, if no light energy has been received, the semiconducting photodetector device continues to monitor generation of light energy. If light energy is detected, at a decision block 416 it is determined if the semiconducting photodetector device is configured to monitor an intensity of the light energy detected. If so, the intensity is measured at block 420. As previously described, the intensity of the light energy can be measured to determine the energy of sparks emitted by coupling the output of the semiconducting photodetector device to a monitoring device, such as an oscilloscope, and setting the monitoring device to measure the voltage output of the semiconducting photodetector device. At a decision block 424, if the stimulus applied to generate the sparks is known, at a block 428 the voltage output of the semiconducting photodetector is compared to that of the stimulus to analyze what type of stimulus produces what nature of sparks.

If at the decision block 416 it is determined that intensity of the sparks is not being measured, or at the decision block 424 it is determined that either the stimulus is not known, or the stimulus is known and has been compared to the intensity of the voltage output of the semiconducting photodetector device, then at a block 432 it is determined whether timing of the sparks generated also is being measured. If so, at a block 436, times at which the sparks were generated are measured. At a decision block 440 it is determined if timing of the stimulus causing the sparks is known. If so, timing of the stimulus relative to that of the sparks generated is determined at a block 444. If the intensity and/or timing have been measured at the blocks 428 and 444, respectively, or if either measurement has been disregarded at the decision blocks 416 and 432, respectively, the method returns to the block 408 to monitor for further emission of light energy from sparks.

It will be appreciated that many additional steps could be added to this method and remain within the broad principles of the present invention. For one example, the output of the solid state spark detecting device might not only be monitored and measured, but also recorded for playback, manipulation, and/or analysis. For a second example, as shown in FIG. 3, use of a conventional camera 324 (FIG. 3) could be used to determine the exact point in the body under study 304 from which sparks were generated. Using a photographic camera to also monitor for emission of sparks would proceed in parallel with the method previously described. Use of a photographic camera may entail positioning the camera, opening the shutter prior to the expected generation of sparks, closing the shutter after the end of the expected generation of sparks, rendering a photograph through developing or Polaroid® process, and studying the sparks detected.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for generating and detecting sparks for testing a selected material, the apparatus comprising:
    a semiconducting photodetector having a pair of electrical conductors for carrying an electrical current generated when the semiconducting photodetector receives light energy generated by sparks;
    an electrical current detector operably coupled with the electrical conductors for sensing the electrical current generated to signal receipt of the light energy generated by sparks; and
    a spark generator proximate to the photodetector that is configured to direct a spark discharge of predetermined magnitude towards the selected material, wherein light energy generated by the discharge is at least partially detected by the photodetector.

2. The apparatus of claim 1, wherein the semiconducting photodetector includes a high sensitivity photodiode.

3. The apparatus of claim 1, wherein the semiconducting photodetector includes a PN photodiode.

4. The apparatus of claim 1, wherein the semiconducting photodetector includes a PiN photodiode.

5. The apparatus of claim 1, wherein the semiconducting photodetector includes an avalanche PN junction photodiode.

6. The apparatus of claim 1, wherein the semiconducting photodetector is electrically biased.

7. The apparatus of claim 1, wherein the electrical current detector includes at least one op amp.

8. The apparatus of claim 2, wherein the electrical current detector includes at least one low-noise op amp.

9. The apparatus of claim 8, wherein the electrical current detector includes two low noise op amps, a first op amp being configured as a voltage follower, receiving a first output from the semiconducting photodetector, and a second op amp being configured as an inverting amplifier, receiving a second output from the first op amp and generating an amplified output signal of the electrical current generated when the semiconducting photodetector receives light energy generated by sparks.

10. The apparatus of claim 1, further comprising a coupling for engaging a monitoring device for monitoring light energy generated by sparks.

11. The apparatus of claim 10, further comprising a magnitude monitoring device for monitoring magnitude of light energy generated by sparks.

12. The apparatus of claim 10, further comprising a timing monitoring device for monitoring timing of light energy generated by sparks.

13. The apparatus of claim 10, wherein the monitoring device is operable to monitor applied electrical currents and resulting generation of sparks such that a relationship between the applied electrical currents and the resulting generation of sparks can be studied.

14. The apparatus of claim 10, wherein the monitoring device includes an oscilloscope.

15. The apparatus of claim 1, further comprising:
    a plurality of semiconducting photodetectors, each of the plurality of semiconducting photodetectors having a pair of electrical conductors for carrying an electrical current generated when the semiconducting photodetector receives light energy, each of the semiconducting photodetectors being adapted to receive one of a plurality of different types of light energy as generated by sparks; and
    a plurality of electrical current detectors each being operably coupled with a respective pair of electrical conductors for sensing the electrical current generated by a respective semiconducting photodetector to signal receipt of the light energy generated by sparks.

16. The apparatus of claim 15, wherein the different types of light energy are differentiated by different magnitudes of light energy.

17. The apparatus of claim 15, wherein the different types of light energy are differentiated by different wavelengths of light.

18. An apparatus for generating and detecting a spark discharge, the apparatus comprising:
    a semiconducting photodetector, the semiconducting photodetector having a pair of electrical conductors for carrying an electrical current generated when the semiconducting photodetector receives light energy emitted by sparks;
    an electrical current detector operably coupled with the electrical conductors for sensing the electrical current generated to signal receipt of the light energy;
    a power source supplying power to the semiconducting photodetector and the electrical current detector;
    a spark generator coupled to a spark probe that is configured to direct a spark discharge of predetermined magnitude towards a selected test object, wherein light energy generated by the discharge is at least partially detected by the photodetector; and
    a shielding housing containing the semiconducting photodetector, the electrical current detector, and the spark probe, the shielding housing including at least one material for shielding the semiconducting photodetector and the electrical current detector from at least one of electrical and magnetic forces.

19. The apparatus of claim 18, wherein the semiconducting photodetector includes a high sensitivity photodiode.

20. The apparatus of claim 18, wherein the semiconducting photodetector includes a PN photodiode.

21. The apparatus of claim 18, wherein the semiconducting photodetector includes a PiN photodiode.

22. The apparatus of claim 18, wherein the semiconducting photodetector includes an avalanche PN junction photodiode.

23. The apparatus of claim 18, wherein the semiconducting photodetector is electrically biased.

24. The apparatus of claim 18, wherein the electrical current detector includes at least one op amp.

25. The apparatus of claim 18, wherein the electrical current detector includes at least one low-noise op amp.

26. The apparatus of claim 25, wherein the electrical current detector includes two low noise op amps, a first op amp being configured as a voltage follower, receiving a first output from the semiconducting photodetector, and a second op amp being configured as an inverting amplifier, receiving a second output from the first op amp and generating an amplified output signal of the electrical current generated when the semiconducting photodetector receives light energy generated by sparks.

27. The apparatus of claim 18, further comprising a coupling for engaging a monitoring device for monitoring light energy generated by sparks.

28. The apparatus of claim 27, further comprising a magnitude monitoring device for monitoring magnitude of light energy generated by sparks.

29. The apparatus of claim 27, further comprising a timing monitoring device for monitoring timing of light energy generated by sparks.

30. The apparatus of claim 27, wherein the monitoring device for monitoring applied electrical currents and resulting generation of sparks such that a relationship between the applied electrical currents and the resulting generation of sparks can be studied.

31. The apparatus of claim 27, wherein the monitoring device is an oscilloscope.

32. The apparatus of claim 18, further comprising:
a plurality of semiconducting photodetectors, each of the plurality of semiconducting photodetectors having a pair of electrical conductors for carrying an electrical current generated when the semiconducting photodetector receives light energy, each of the semiconducting photodetectors being adapted to receive one of a plurality of different types of light energy as generated by sparks; and
a plurality of electrical current detectors each being operably coupled with a respective pair of electrical conductors for sensing the electrical current generated by a respective semiconducting photodetector to signal receipt of the light energy generated by sparks.

33. The apparatus of claim 32, wherein the different type of light energy are differentiated by different magnitudes of light energy.

34. The apparatus of claim 32, wherein the different types of light energy are differentiated by different wavelengths of light.

35. A system for spark detection in response to applying a known electrical stimulus to a body under test, the system comprising:
a light sealed testing chamber containing the body under test;
an electrical stimulus generator configured to apply the known electrical stimulus to the body under test;
a camera disposed in the testing chamber configured to record a position of at least one spark that may be generated by the body under test; and
a solid state spark monitoring device disposed in the testing chamber to monitor the generation of at least one spark that may be generated by the body under test, the solid state spark monitoring device comprising:
a semiconducting photodetector, the semiconducting photodetector having a pair of electrical conductors for carrying an electrical current generated when the semiconducting photodetector receives light energy emitted by sparks;
an electrical current detector operably coupled with the electrical conductors for sensing the electrical current generated to signal receipt of the light energy;
a power source supplying power to the semiconducting photodetector and the electrical current detector; and
a shielding housing containing the semiconducting photodetector and the electrical current detector, the shielding housing including at least one material for shielding the semiconducting photodetector and the electrical current detector from at least one of electrical and magnetic forces.

36. The system of claim 35, wherein the semiconducting photodetector includes a high sensitivity photodiode.

37. The system of claim 35, wherein the semiconducting photodetector includes a PN photodiode.

38. The system of claim 35, wherein the semiconducting photodetector includes a PiN photodiode.

39. The system of claim 35, wherein the semiconducting photodetector includes an avalanche PN junction photodiode.

40. The system of claim 35, wherein the semiconducting photodetector is electrically biased.

41. The system of claim 35, wherein the electrical current detector includes at least one op amp.

42. The system of claim 35, such that the electrical current detector includes at least one low-noise op amp.

43. The system of claim 35, wherein the electrical current detector includes two low noise op amps, a first op amp being configured as a voltage follower, receiving a first output from the semiconducting photodetector, and a second op amp being configured as an inverting amplifier, receiving a second output from the first op amp and generating an amplified output signal of the electrical current generated when the semiconducting photodetector receives light energy generated by sparks.

44. The system of claim 35, further comprising a coupling for engaging a monitoring device for monitoring light energy generated by sparks.

45. The system of claim 44, further comprising a magnitude monitoring device for monitoring magnitude of light energy generated by sparks.

46. The system of claim 44, further comprising a timing monitoring device for monitoring timing of light energy generated by sparks.

47. The system of claim 44 wherein the monitoring device is operable to monitor applied electrical currents and resulting generation of sparks such that a relationship between the applied electrical currents and the resulting generation of sparks can be studied.

48. The system of claim 44, wherein the monitoring device is an oscilloscope.

49. The system of claim 35, further comprising:
a plurality of semiconducting photodetectors, each of the plurality of semiconducting photodetectors having a pair of electrical conductors for carrying an electrical current generated when the semiconducting photodetector receives light energy, each of the semiconducting photodetectors being adapted to receive one of a plurality of different types of light energy as generated by sparks; and a plurality of electrical current detectors each being operably coupled with a respective pair of electrical conductors for sensing the electrical current generated by a respective semiconducting photodetector to signal receipt of the light energy generated by sparks.

50. The system of claim 49, wherein the different type of light energy are differentiated by different magnitudes of light energy.

51. The system of claim 49, wherein the different types of light energy are differentiated by different wavelengths of light.

52. A method for generating and detecting sparks for testing a selected material, the method comprising;

directing a spark discharge of predetermined magnitude towards the selected material:

positioning a semiconducting photodetector to receive light energy emitted by the directed spark discharge in an area of interest, the semiconducting photodetector generating an electrical current proportional to a degree of light energy received; and measuring the electrical current generated by the semiconducting photodetector to study the sparks that may be generated.

53. The method of claim 52, the method including measuring the electrical current generated to determine the intensity of the light energy received such that an intensity of the sparks that may be generated can be measured.

54. The method of claim 52, the method including measuring the electrical current generated to determine the intensity of the light energy received relative to a known electrical stimulus applied for purposes of generating the sparks that may be generated in an area of interest.

55. The method of claim 52, the method including comparing an event time at which the electrical current generated indicating generation of sparks relative to a stimulus time at which a known electrical stimulus was applied.

56. The method of claim 52, further comprising:

positioning a plurality of semiconducting photodetectors, each of the plurality of semiconducting photodetectors being adapted to receive one of a plurality of different types of light energy as generated by sparks; and measuring the electrical current generated by each of the respective semiconducting photodetectors to signal receipt of the light energy generated by sparks.

57. The method of claim 56, wherein the different types of light energy are differentiated by different magnitudes of light energy.

58. The method of claim 56, wherein the different types of light energy are differentiated by different wavelengths of light.

* * * * *